United States Patent

[11] 3,572,568

[72] Inventors Phillip A. Lutz;
Peter D. Lintzenich, Kokomo, Ind.
[21] Appl. No. 805,571
[22] Filed Mar. 10, 1969
[45] Patented Mar. 30, 1971
[73] Assignee General Motors Corporation
Detroit, Mich.

[54] ENDLESS LOOP TAPE CARTRIDGE
1 Claim, 2 Drawing Figs.

[52] U.S. Cl. .......... 226/108, 242/55.19, 226/195
[51] Int. Cl. .......... G11b 23/04
[50] Field of Search .......... 226/89, 90, 91, 195, 187, 168, 108; 179/100.2 (2); 242/55.19, 194, 197—200

[56] References Cited

UNITED STATES PATENTS

| | | | |
|---|---|---|---|
| 3,021,989 | 2/1962 | Sellers | 226/187X |
| 3,289,906 | 12/1966 | Schuller | 226/168 |
| 3,482,772 | 12/1969 | Auld | 179/100.2(2) |
| 3,493,193 | 2/1970 | Crandall et al. | 226/187X |

*Primary Examiner*—Allen N. Knowles
*Attorneys*—E. W. Christen, C. R. Meland and Tim G. Jagodzinski

ABSTRACT: A magnetic tape cartridge includes an internal pressure roller cooperating with an external drive roller so as to drive an endless loop of tape therebetween. A takeup apparatus is located within the tape cartridge to prevent the accumulation of slack tape in the area surrounding the pressure roller. The takeup apparatus comprises an auxiliary drive roller which cooperates with a bearing device so as to tension the tape as it leaves the pressure roller.

Patented March 30, 1971 3,572,568

INVENTORS.
Phillip A. Lutz, &
BY Peter D. Lintzenich
C. R. Meland
ATTORNEY

ENDLESS LOOP TAPE CARTRIDGE

This invention relates to a tape cartridge, and more particularly to a tape cartridge for use with an endless loop of magnetic tape.

In a typical endless loop tape cartridge, an internal pressure roller cooperates with an external drive roller so as to drive the endless loop of tape between the rollers. Normally, the tape is wound in spiral convolutions upon a storage reel, and is continuously withdrawn from the innermost convolution and restored to the outermost convolution as the storage reel rotates in response to movement of the tape. Ordinarily, the tape is provided with a certain amount of looseness so as to reduce the friction between the convolutions of the tape wound upon the storage reel. The reduced friction facilitates withdrawal of the tape from the storage reel and helps to preserve the quality of the intelligence carried by the tape.

However, due largely to the looseness of the tape, slack tape tends to accumulate upon leaving the pressure roller, especially during initial operation. Additionally, the accumulation of slack tape may be produced by erratic operation of the storage reel. In any event, this accumulation of slack tape often results in the tape becoming internally entangled with the pressure roller or externally entangled with the drive roller thereby jamming the rollers and damaging the tape. The present invention proposes an endless loop tape cartridge which alleviates these problems.

According to one aspect of the invention, the tape leaving the pressure roller is continuously removed from the area surrounding the pressure roller so as to prevent the accumulation of slack tape near the pressure roller. In general, this is accomplished by a takeup apparatus including an auxiliary drive roller and a bearing device which cooperate to drive the tape therebetween out of the area of the pressure roller.

In another aspect of the invention, the tape is tensioned by the takeup apparatus thereby to more readily prevent the accumulation of slack tape in the area of the pressure roller, Generally, this is accomplished by driving the auxiliary drive roller at a surface speed in excess of the surface speed of the pressure roller so that the auxiliary drive roller frictionally slips against the tape as the tape is driven. Alternately, the auxiliary drive roller may be equipped with a friction clutch to prevent it from slipping against the tape.

In yet another aspect of the invention, the initial rotation of the auxiliary drive roller occurs simultaneously with the initial rotation of the pressure roller thereby to prevent the accumulation of slack tape during startup operation. In general, this is accomplished by a belt drive mechanism connecting the auxiliary drive roller to the pressure roller so that the auxiliary drive roller is driven by the pressure roller through the belt drive mechanism.

The invention may be best understood by reference to the following detailed description of the preferred embodiments when considered in conjunction with the accompanying drawing, in which.

Figure 1:
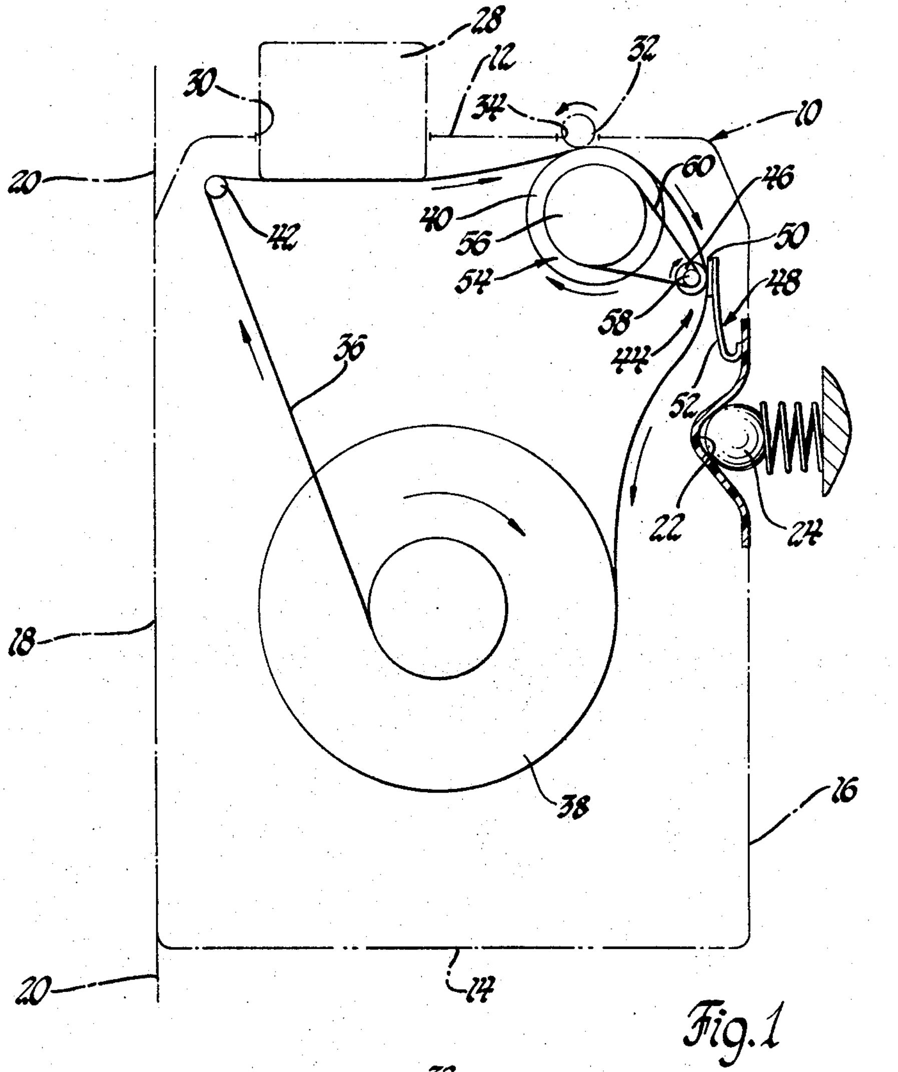
FIG. 1 is a schematic plan view of an endless loop tape cartridge incorporating one preferred embodiment of the invention.

FIG. 1 discloses a magnetic tape cartridge including an enclosed housing or casing 10 having a front portion 12, a rear portion 14, a right side portion 16, and a left side portion 18. The casing 10 may conventionally take the form of any of the thin rectangular capsules or containers well known in the art. The casing 10 is manually positionable within a tape player (not shown) by gripping the rear portion 14 and inserting the casing 10 into the tape player front portion 12 first. In inserting the casing 10 into the tape player, the left side portion 18 slides over a reference surface 20 in the tape player until a notch 22 in the right side portion 16 is engaged by a resiliently biased detent 24 in the tape player thereby to releasably lock the casing 10 in the play position. In the play position, a magnetic transducer apparatus 28 in the tape player extends slightly within an opening 30 in the front portion 12 of the casing 10. Similarly, a drive roller or capstan 32 in the tape player extends slightly within an opening 34 in the front portion 12 of the casing 10. The capstan 32 is connected to an external drive mechanism (not shown) for rotating the capstan 32 in the direction indicated by the arrow. Typically, the transducer apparatus 28 may include an erase head and a pickup head.

An endless loop of magnetic tape 36 is wound in spiral convolutions upon a storage reel 38 which is rotatably mounted within and supported by the casing 10. A pressure roller 40 is rotatably supported within the casing 10 adjacent the opening 34 in the front portion 12 so as to cooperate with the capstan 32 thereby to frictionally hold or pinch the tape 36 between the pressure roller 40 and the capstan 32. A guidepost 42 is mounted within the casing 10 for directing the tape 36 from the innermost convolution on the storage reel 38 across the transducer apparatus 28 to the capstan 32 and the pressure roller 40. A takeup mechanism 44, which will be more fully discussed later, is located within the casing 10 for directing the tape 36 from the capstan 32 and the pressure roller 40 to the outermost convolution on the storage reel 38.

In operation, the capstan 32 is rotated by the external drive mechanism so as to frictionally drive the tape 36 in the direction indicated by the arrows between the capstan 32 and pressure roller 40 which is rotated by the capstan 32. The tape 36 travels from the storage reel 38, over the guidepost 42, across the transducer apparatus 28, between the capstan 32 and the pressure roller 40, through the takeup apparatus 44, and back to the storage reel 38. In the storage reel 38, the tape 36 is withdrawn from the innermost convolution thereby rotating the reel 38 so as to restore the tape 36 to the outermost convolution.

As previously discussed, a certain amount of looseness is typically provided in the tape 36 so as to improve the noise quality of the tape 36 by reducing the friction between the convolutions wound upon the storage reel 38. However, during startup operation, the rotation of the storage reel 38 may not begin until sometime after the rotation of the capstan 32 and the pressure roller 40 has begun. This is primarily due to a lost motion effect produced by the looseness of the tape 36. When this occurs, the tape 36 leaving the pressure roller 40 is not immediately taken up by the storage reel 38, but rather accumulates in the area surrounding the pressure roller 40. In addition, the accumulation of tape in the area of the pressure roller 40 may be produced by irregular rotation of the storage reel 38 due to a malfunction. In either event, the accumulation of the tape 36 in the area of the pressure roller 40 is undesirable because it may result in the tape 36 becoming internally entangled with the pressure roller 40 or externally entangled with the capstan 32 thereby damaging the tape 36. The takeup apparatus 44 prevents the accumulation of the tape 36 in the area surrounding the pressure roller 40 so as to alleviate this problem.

The takeup apparatus 44 comprises an auxiliary drive roller 46 which cooperates with a bearing device 48 so as to drive the tape 36 therebetween out of the area of the pressure roller 40. The bearing device 48 includes a bearing member 50 mounted on the end of a leaf spring 52 which is attached to the right side portion 16 of the casing 10. The leaf spring 52 resiliently urges the bearing member 50 toward the auxiliary drive roller 46 so as to frictionally engage or pinch the tape 36 between the bearing member 50 and the auxiliary drive roller 46. The bearing member 50 may be any suitable bearing element such as a felt pad. A drive mechanism 54 rotates the auxiliary drive roller in the direction indicated by the arrow so as to frictionally drive the tape 36 between the auxiliary drive roller 46 and the bearing member 50 thereby to prevent the tape 36 from accumulating in the area of the pressure roller 40.

Preferably, the drive mechanism 54 comprises a relatively large sheave 56 attached to the pressure roller 40, a relatively small sheave 58 attached to the auxiliary drive roller 46, and an endless belt 60 connecting the sheaves 56 and 58. As the pressure roller 40 is rotated by the capstan 32, the sheave 56 revolves with the pressure roller 40 so as to frictionally transport the belt 60. The auxiliary drive roller 46 revolves with the sheave 58 which is frictionally rotated by the movement of the belt 60.

Due to the fact that the circumference of the sheave 56 is larger than the circumference of the sheave 58, the auxiliary drive roller 46 is rotated at a surface speed somewhat in excess of the surface speed of the pressure roller 40. Consequently, the auxiliary drive roller 46 frictionally slips against the tape 36 so as to continuously maintain the tape 36 in tension thereby to facilitate the removal of the tape 36 from the area surrounding the pressure roller 40. Further, since the auxiliary drive roller 46 is driven by the pressure roller 40 through the drive mechanism 54, the initial rotation of the auxiliary drive roller 46 occurs simultaneously with the initial rotation of the pressure roller 40 thereby to prevent the accumulation of the tape 36 in the area of the pressure roller 40 during startup operation. Alternately, a friction clutch may be provided between the auxiliary drive roller 46 and the sheave 58 to prevent the auxiliary drive roller from slipping against the tape 36. It is to be understood that the auxiliary drive roller 46 need only be driven at the same surface speed as the pressure roller 40 in order to adequately prevent the tape 36 from accumulating in the area surrounding the pressure roller 40.

Figure 2:
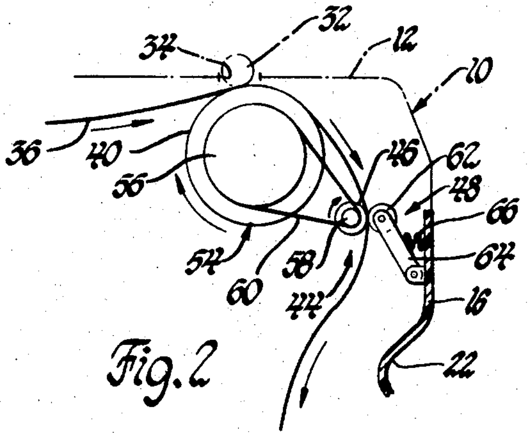
FIG. 2 is a schematic plan view of a portion of an endless loop tape cartridge incorporating another preferred embodiment of the invention.

FIG. 2 discloses a portion of a magnetic tape cartridge identical in structure and operation to the magnetic tape cartridge shown in FIG. 1 except for the bearing device 48. Like numerals are used to denote like elements. In FIG. 2, the bearing device 48 includes an auxiliary pressure roller 62 rotatably mounted on an arm 64 which is pivotably supported by the right side portion 16 of the casing 10. A coil spring 66 is seated between the arm 64 and the right side portion 16 of the casing 10 thereby to resiliently urge the arm 64 counterclockwise so that the tape 36 is frictionally engaged or pinched between the auxiliary pressure roller 62 and the auxiliary drive roller 46. As the auxiliary drive roller 46 is rotated by the pressure roller 40 through the drive mechanism 54, the tape 36 is frictionally driven between the auxiliary drive roller 46 and the auxiliary pressure roller 62 which is rotated by the auxiliary drive roller 46.

It will now be readily understood that the preferred embodiments of the invention disclosed herein are shown for demonstration purposes only, and that many modifications and variations thereof may be made without departing from the spirit and scope of the invention. Thus, the illustrated magnetic tape cartridge need not include a storage reel 38 but may merely employ a spill chamber. Similarly, the drive mechanism 54 need not be a belt mechanism but could be any suitable drive mechanism such as a gear mechanism. Likewise, the bearing device 48 need not be biased against the auxiliary drive roller 46 but rather the auxiliary drive roller 46 could be biased against the bearing surface 48, or both could be biased against each other. Further, the takeup apparatus 44 could include additional auxiliary rollers 46 and bearing devices 48.

We claim:

1. An endless loop tape cartridge comprising: a casing; an endless loop of tape disposed within the casing; a pressure roller mounted within the casing for cooperating with an external drive roller so as to frictionally engage the tape between the drive roller and the pressure roller so that the tape is driven between the drive roller and the pressure roller and the pressure roller is rotated by the drive roller when the drive roller is rotated; an auxiliary drive roller mounted within the casing and spaced from the pressure roller in the direction of tape travel; bearing means mounted within the casing and including a bearing member positioned adjacent the auxiliary drive roller, and resilient means connected with the bearing member for urging the bearing member toward the auxiliary drive roller so that the tape is frictionally engaged between the bearing member and the auxiliary drive roller; and drive means including a first sheave having a predetermined circumference and attached to the pressure roller, a second sheave having a predetermined circumference which is smaller than the circumference of the first sheave and attached to the auxiliary drive roller, and an endless belt assembled over the circumference of the first sheave and the circumference of the second sheave thereby connecting the sheaves so as to rotate the auxiliary drive roller in response to rotation of the pressure roller whereby the tape leaving the pressure roller is tensioned thereby to facilitate the removal of the tape from the area surrounding the pressure roller, and whereby initial rotation of the auxiliary drive roller occurs simultaneously with initial rotation of the pressure roller thereby to prevent the accumulation of slack tape in the area of the pressure roller during startup operation.